Nov. 21, 1950        G. C. ELLERBECK        2,530,515
VALUE SELECTING AND ENTERING MECHANISM

Filed May 3, 1948                        12 Sheets-Sheet 1

*INVENTOR.*
GRANT C. ELLERBECK
*BY*

Nov. 21, 1950     G. C. ELLERBECK     2,530,515
VALUE SELECTING AND ENTERING MECHANISM
Filed May 3, 1948     12 Sheets-Sheet 2
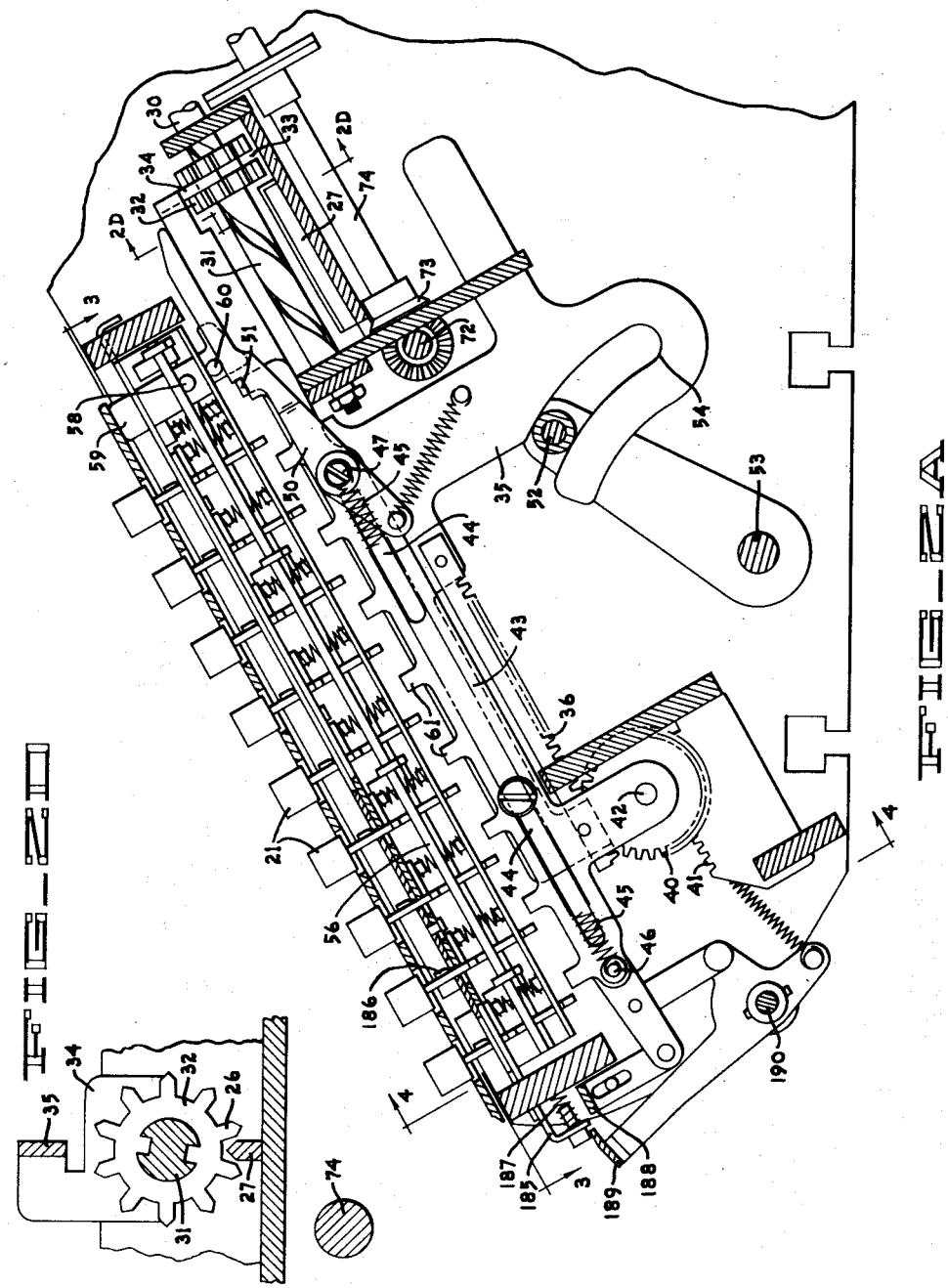
INVENTOR.
GRANT C. ELLERBECK
BY

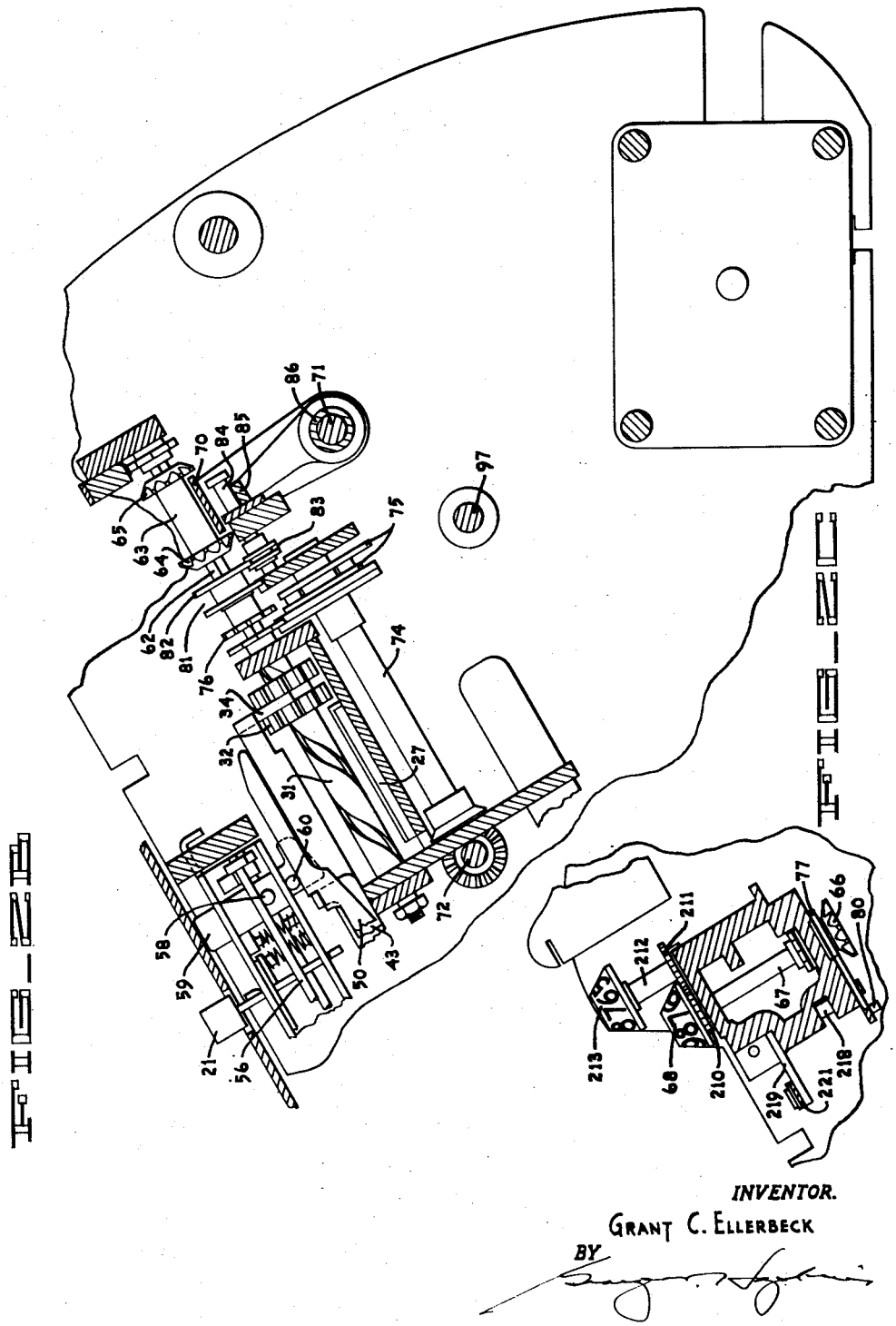

Nov. 21, 1950   G. C. ELLERBECK   2,530,515
VALUE SELECTING AND ENTERING MECHANISM
Filed May 3, 1948   12 Sheets-Sheet 4
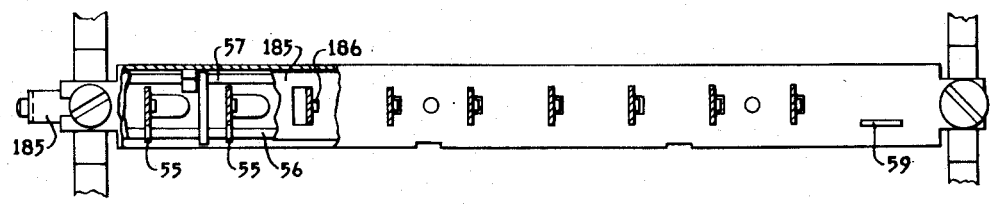
FIG_3
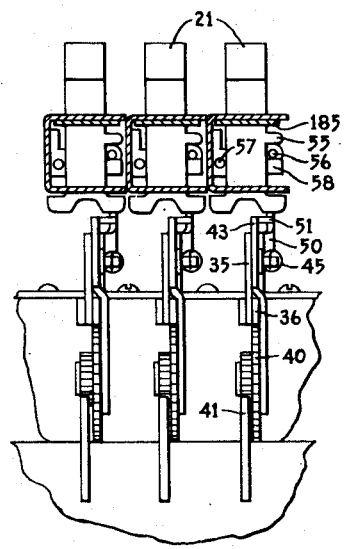
FIG_4
INVENTOR.
GRANT C. ELLERBECK
BY Nov. 21, 1950  G. C. ELLERBECK  2,530,515
VALUE SELECTING AND ENTERING MECHANISM
Filed May 3, 1948  12 Sheets-Sheet 5
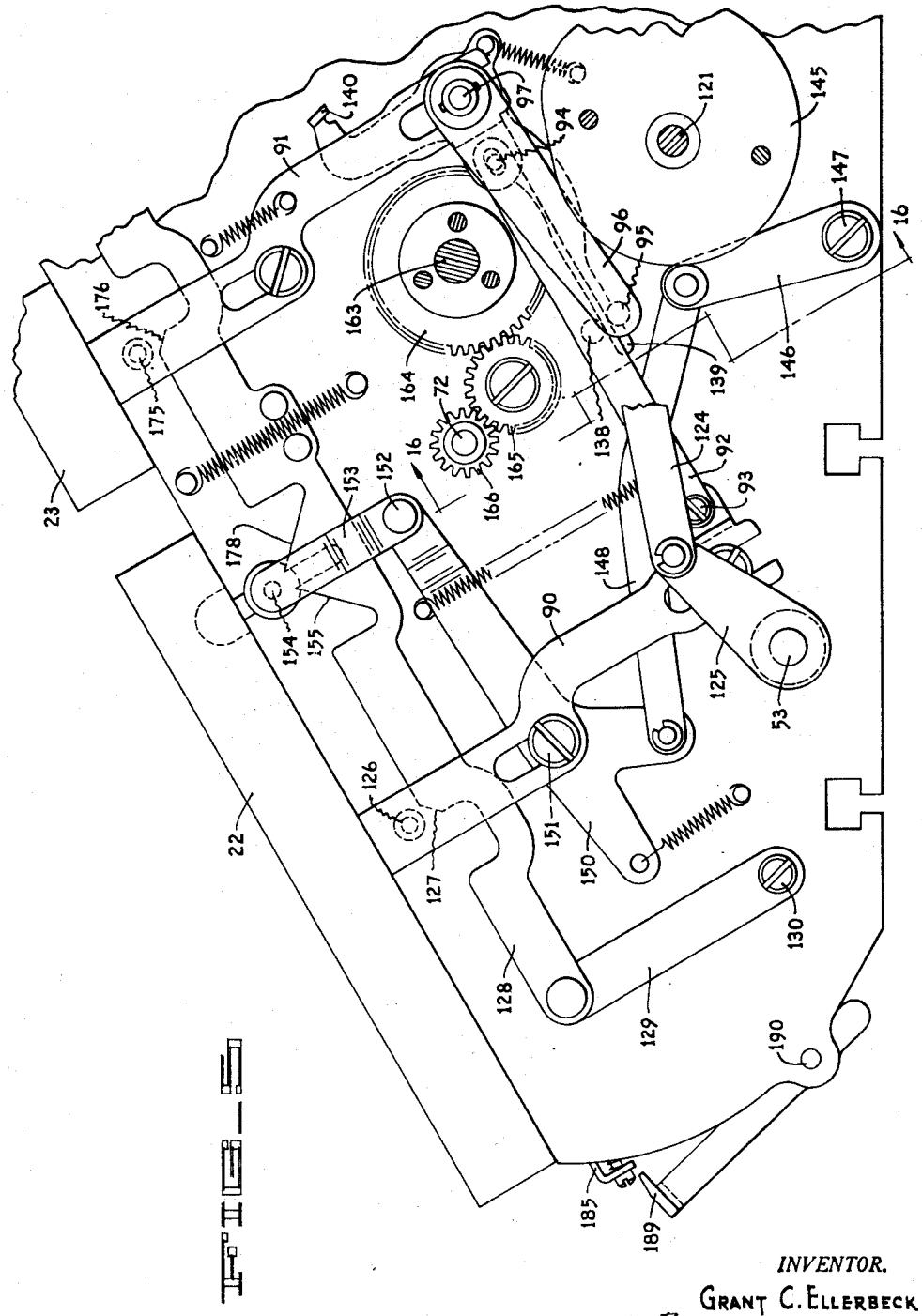
INVENTOR.
GRANT C. ELLERBECK

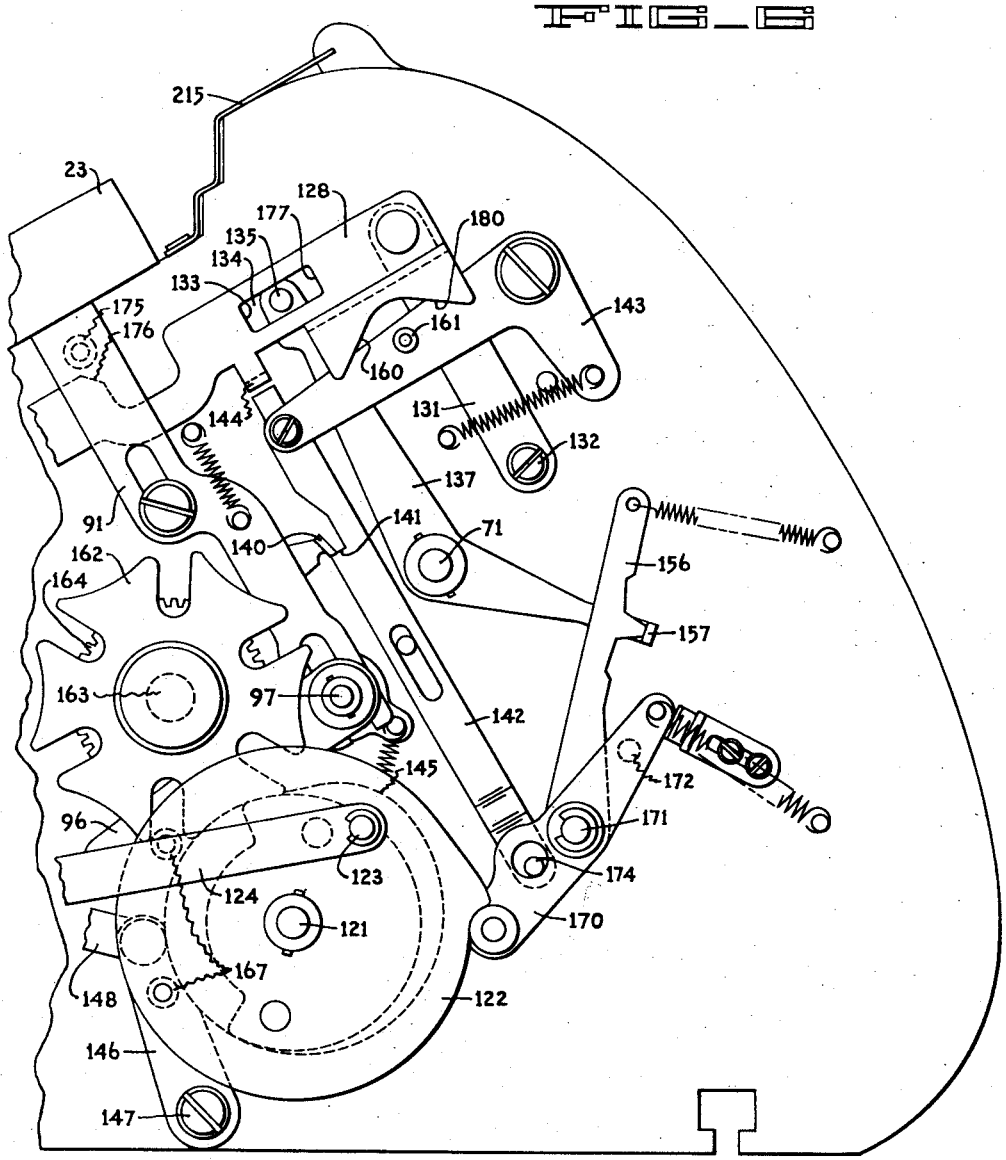

Nov. 21, 1950 G. C. ELLERBECK 2,530,515
VALUE SELECTING AND ENTERING MECHANISM
Filed May 3, 1948 12 Sheets-Sheet 7
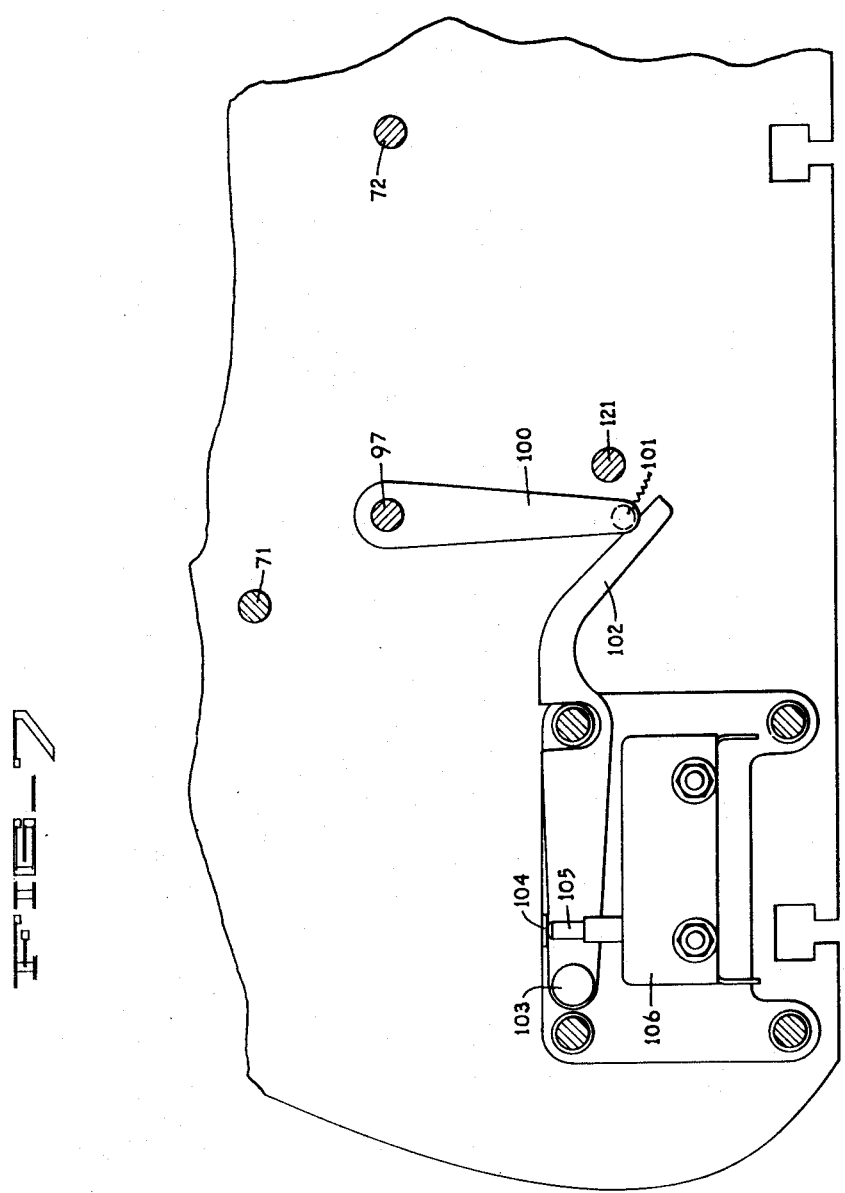
INVENTOR.
GRANT C. ELLERBECK
BY

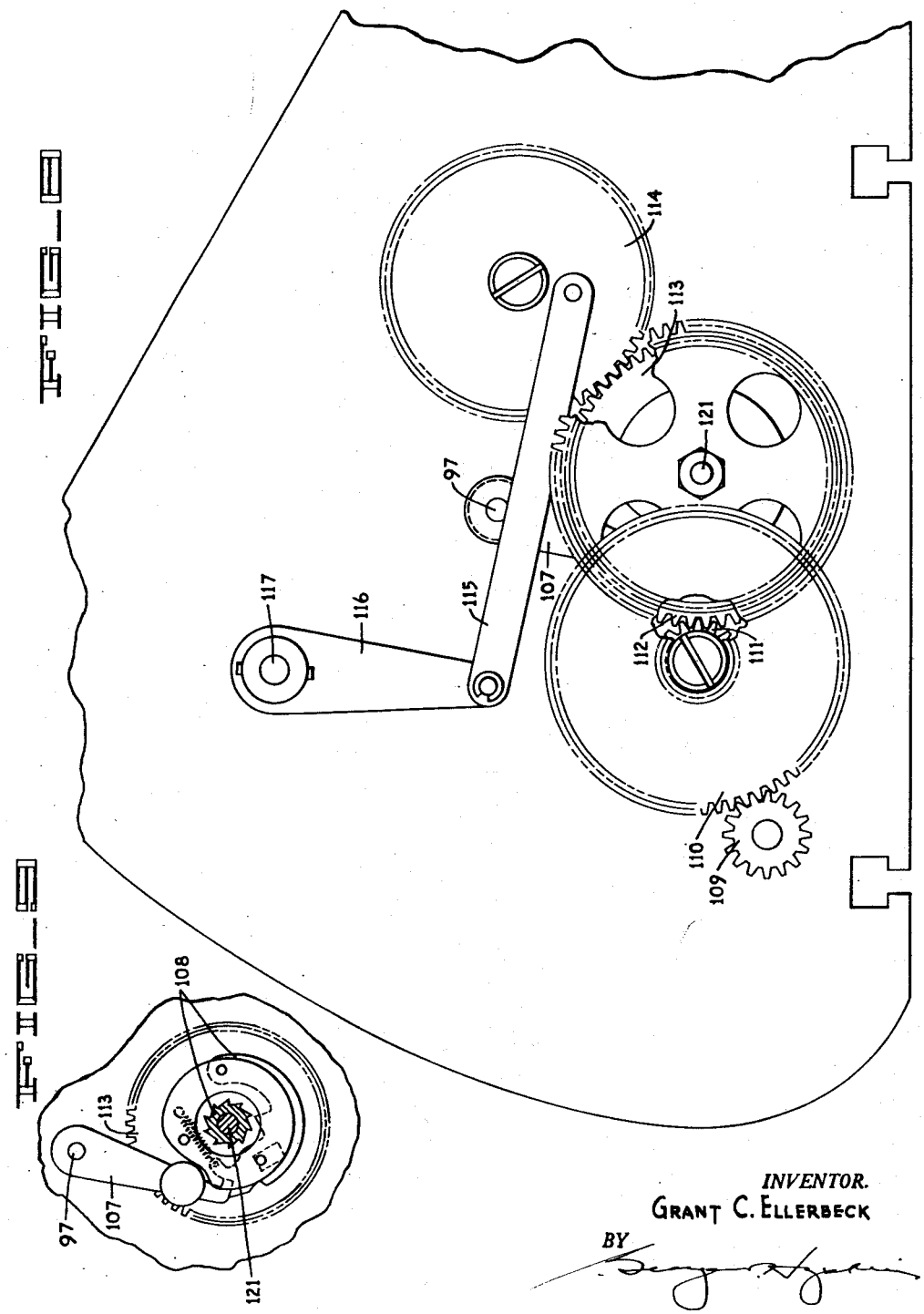

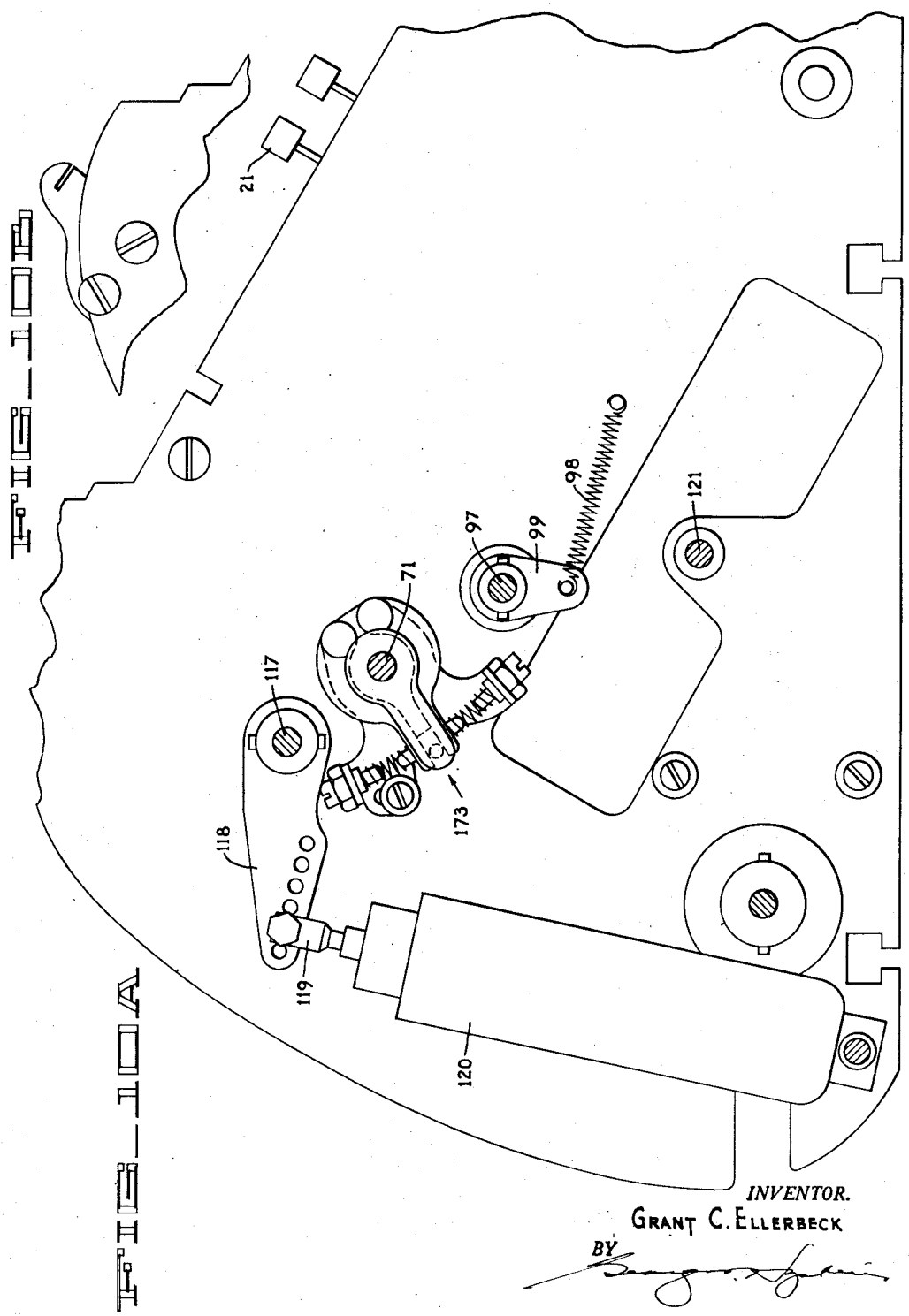
Nov. 21, 1950 — G. C. ELLERBECK — 2,530,515
VALUE SELECTING AND ENTERING MECHANISM
Filed May 3, 1948 — 12 Sheets-Sheet 9
FIG_10B
FIG_10A
INVENTOR.
GRANT C. ELLERBECK
BY Nov. 21, 1950　　　　　G. C. ELLERBECK　　　　　2,530,515
VALUE SELECTING AND ENTERING MECHANISM
Filed May 3, 1948　　　　　　　　　　　　　12 Sheets-Sheet 10
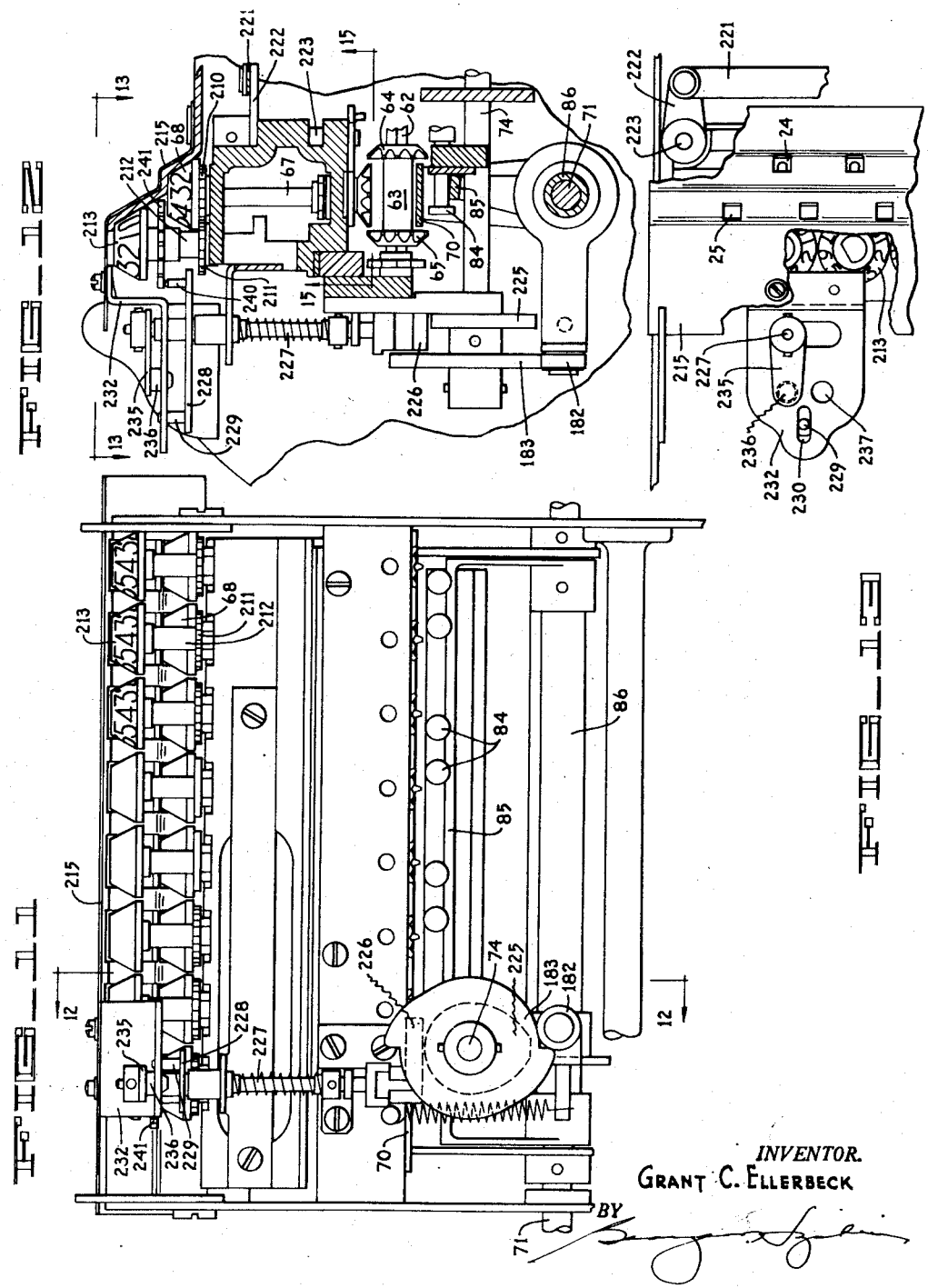
INVENTOR.
GRANT C. ELLERBECK Nov. 21, 1950 G. C. ELLERBECK 2,530,515
VALUE SELECTING AND ENTERING MECHANISM
Filed May 3, 1948 12 Sheets—Sheet 11
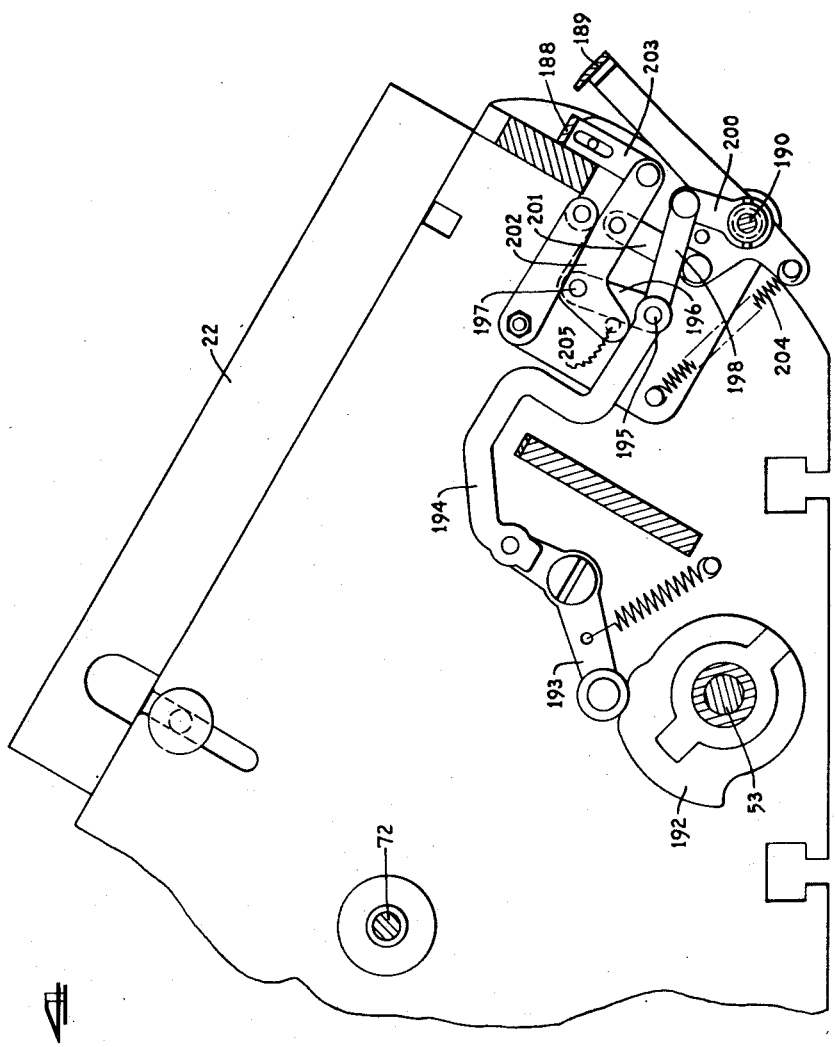
INVENTOR.
GRANT C. ELLERBECK
BY Nov. 21, 1950 G. C. ELLERBECK 2,530,515
VALUE SELECTING AND ENTERING MECHANISM
Filed May 3, 1948 12 Sheets-Sheet 12
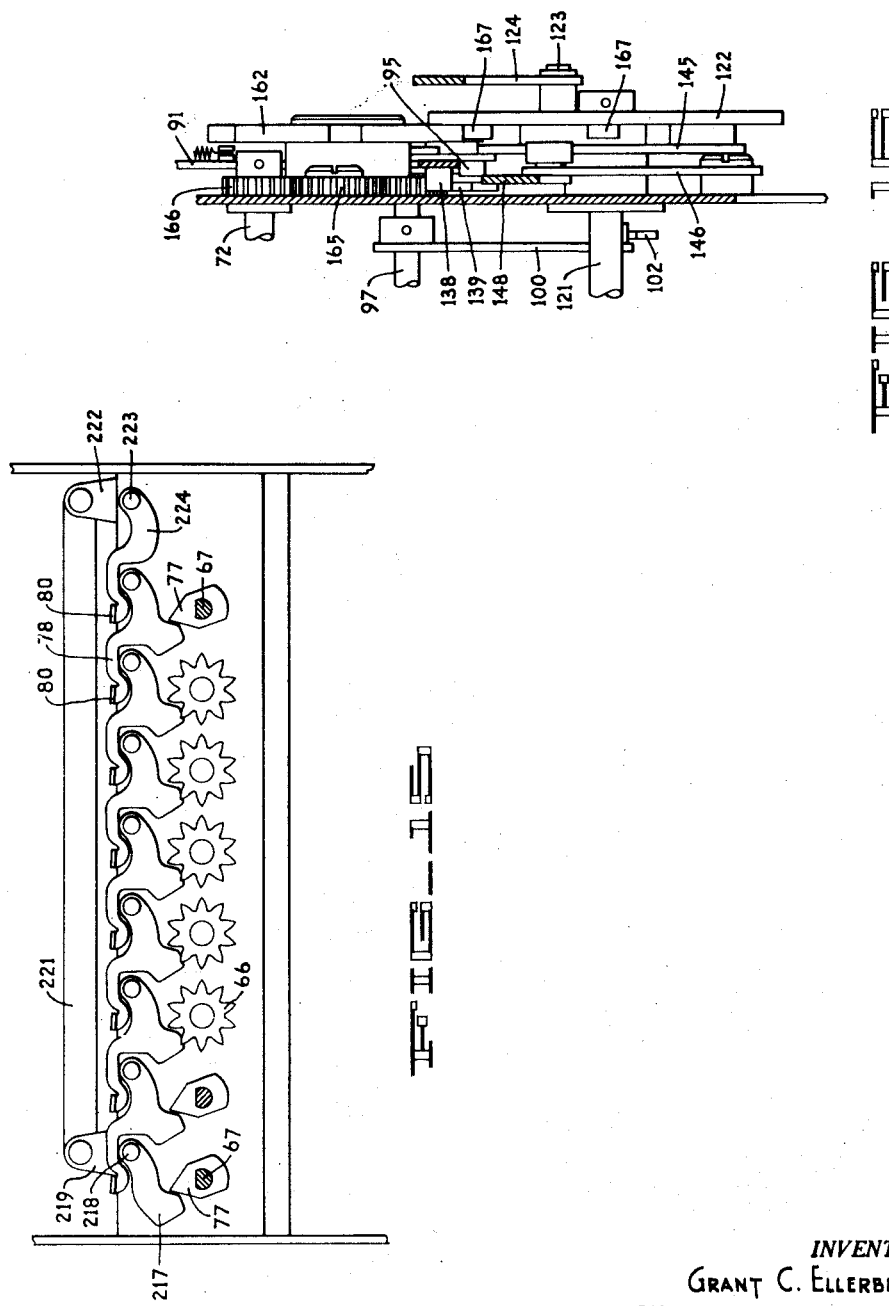
INVENTOR.
GRANT C. ELLERBECK
BY Patented Nov. 21, 1950

2,530,515

UNITED STATES PATENT OFFICE 2,530,515

VALUE SELECTING AND ENTERING MECHANISM

Grant C. Ellerbeck, San Leandro, Calif., assignor to Friden Calculating Machine Co., Inc., a corporation of California Application May 3, 1948, Serial No. 24,888

10 Claims. (Cl. 235—73)

This invention relates to adding machines. This application is a continuation in part of my now abandoned application Serial No. 693,730 filed August 29, 1946 and entitled Adding Machine.

One object of the invention is to provide a novel value selecting mechanism.

Another object of the invention is to provide an improved mechanism for entering a selected value in a register.

Another object of the invention is to provide a cyclically operable plural order adding or the like machine including an improved mechanism effective for entering a selected value in a register during only a part of a machine cycle, and tens transfer mechanism for effecting inter-order transfers during a part of a cycle in which the value entering mechanism is ineffective.

Other objects of the invention will become evident after the following disclosure.

In the drawings:

Figure 1 is a plan view of the machine.

Figures 2A, 2B and 2C together comprise a section taken on the line 2—2 in Figure 1, while Figure 2D is a fragmentary sectional view showing the details of the spiral type of differential mechanism.

Figure 3 is a section taken as indicated by the line 3—3 in Fig. 2A.

Figure 4 is a section taken as indicated by the line 4—4 in Fig. 2A.

Figure 5 is a vertical section taken as indicated by the line 5—5 in Fig. 1.

Figure 6 is a vertical section taken as indicated by the line 6—6 in Fig. 1.

Figure 7 is a view of the switch taken as indicated by the line 7—7 in Fig. 1.

Figure 8 is a vertical section taken as indicated by the line 8—8 in Fig. 1.

Figure 9 is a detailed view of the clutch.

Figure 1:
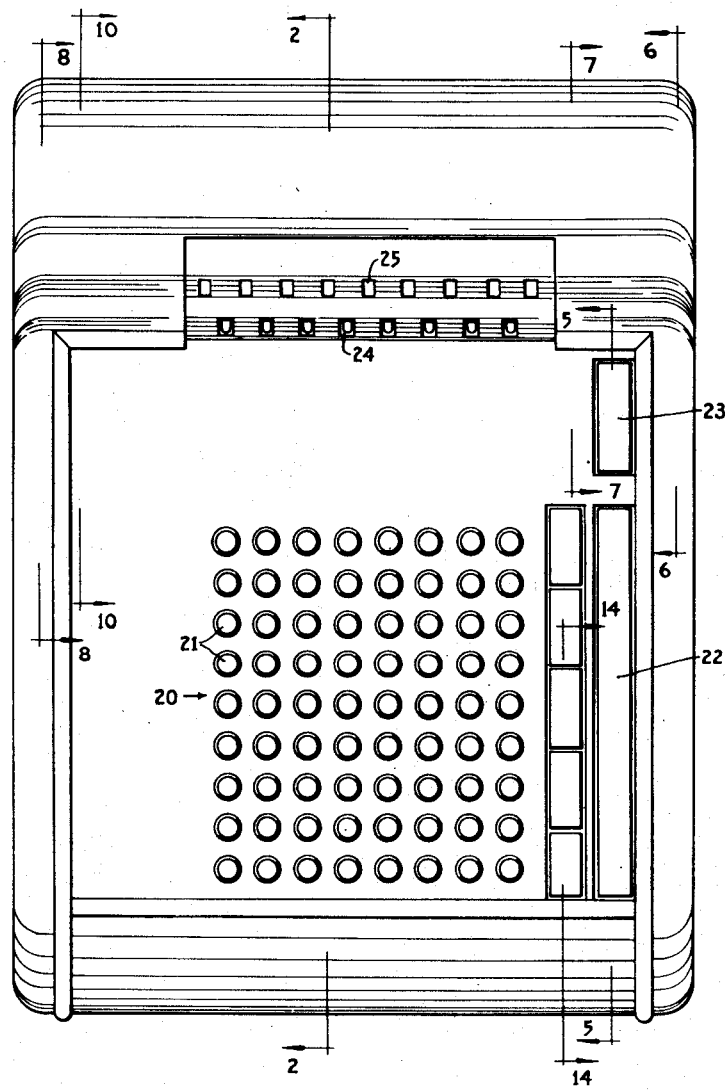

Figures 10A and 10B together comprise a section taken on the line 10—10 in Fig. 1.

Figure 11 is a rear view of the machine with the cover removed.

Figure 12 is a vertical section taken as indicated by the line 12—12 in Fig. 11.

Figure 13 is a plan view with the parts broken away taken as indicated by the line 13—13 in Fig. 12.

Figure 14 is a vertical section taken as indicated by the line 14—14 in Fig. 1.

Figure 15 is a view taken as indicated by the line 15—15 in Fig. 12.

Figure 16 is a fragmentary section taken as indicated by the line 16—16 in Fig. 5.

As shown in Figure 1, the machine is provided with a keyboard 20 comprising a plurality of ordinarily arranged rows of keys 21. After the value has been set on the keyboard 20 it is entered additively by depressing the add bar 22, or negatively by depressing the minus bar 23. Positive totals are indicated by numerals appearing in the lower row of windows 24. Direct negative totals are indicated by numerals appearing in the upper row of windows 25.

Registration control mechanism

Referring to Figures 2A and 2D. Associated with each ordinal row of keys 21 is a shaft 30 which in each cycle is rotated a differential amount corresponding to the key 21 depressed. This is effected by the following mechanism. Shaft 30 has a threaded portion 31 on which is threaded a nut 32 having an annular groove 33 engaged by a fork 34 on a member 35 mounted for sliding movement parallel to the axis of the shaft 30. The nut 32 is provided about its outer periphery with a series of teeth 26 which are adapted to cooperate with a stationary tooth 27 extending longitudinally beneath the shaft 30 so as to restrain the nut against rotation while permitting it to travel forwardly and backwardly in the machine. The tooth 27 is of such length as not to engage between the teeth 26 when the nut is in its normal or rearmost position as shown in Fig. 2A. Hence, the nut 32 and the shaft 30 are free to rotate when the inter-order transfer mechanism operates near the end of the cycle. Member 35 has a rack 36 rigidly attached thereto which engages a gear 40 having a pinion (Fig. 4) of smaller diameter integral therewith engaging a fixed rack 41. The gear and pinion are mounted for rotation on a stud 42 in a slide 43. Slide 43 has two pin and slot connections 44 with the member 35, and a spring 45 is attached at its front end to a stud 46 on the slide 43, and at its rear end is attached to the pin 47 of the rear pin and slot connection 44. Pin 47 is secured to the member 35 so that the spring 45 tends to move the member 35 forwardly, and the slide 43 rearwardly. A latch 50 mounted on the pin 47 normally engages an ear 51 on the slide 43 preventing movement of the slide 43 and the member 35. In the full cycle position all of the members 35 are restrained from movement by a bail 52 secured to a shaft 53 which engages slots 54 in the members 35.

When a numeral key 21 (Fig. 2A) is depressed it releases the latch 50 by the following means. Each key 21 (Fig. 4) has a lug 55 which engages a bail 56 pivoted at 57. As shown in Figure 2A, the bail 56 is common to all the keys 21 in the ordinal row so that depression of any key will cause rocking of the bail. The bail, when rocked, engages a pin 58 on a slide 59 which has a pin 60 that engages the latch 50. Upon depression of either of the bars 22, 23 (Fig. 1) by a means presently to be described, the bail 52 (Fig. 2A) is rocked counterclockwise. Any member 35 which has been unlatched is now free to move forwardly under the influence of its spring 45. The slide 43 will be moved forwardly but, at a slower speed. The member 35 is the driving member because of the mechanical advantage it has in the rack and gear train over the slide 43. The member 35 moved forwardly until one of the lugs 61 on the slide 43 engages the stem of the depressed key. The fork 34 has now moved the nut 32 a differential amount corresponding to the value of the key depressed and has caused the shaft 30 to be rotated a corresponding angular amount.

However, during this part of the cycle the angular rotation of the shaft 30 is not registered. The remainder of the registration control mechanism corresponds to that described in the patent to Friden 2,229,889 issued January 28, 1941, and comprises a square shaft 62 rigidly secured to the threaded shaft 30. Slidably mounted on the square shaft 62 is a sleeve 63 having a pair of bevel gears 64, 65 integral therewith. These gears are normally in a neutral position with respect to a bevel gear 66 (Fig. 2C) on the numeral wheel shaft 67 which has mounted at the upper end thereof a numeral wheel 68. All of the bevel gears 64, 65 are controlled by a gate 70 secured to a shaft 71 suitably mounted in the frame of the machine. By a means presently to be described, the gate 70 is rocked clockwise to engage the bevel gears 64 with the gears 66 for additive registration, and is rocked counter-clockwise to engage bevel gears 65 with the bevel gears 66 for negative registration. During the forward movement of the bail 52 (Fig. 2A) the gate 70 is in its neutral position so that the angular movement of the shaft 30 is not transmitted to the numeral wheel 68. At the end of the forward movement of the bail 52 the gate 70 is moved to engage either the gears 64 or the gears 65 with the gears 66 so that upon return movement of the bail 52 any differentially displaced members 35 are restored to their home position, causing angular rotation of the shaft 30 corresponding to the value of the numeral wheel depressed, which is registered in the numeral wheel 68. In the last part of the cycle, the bail 52 moves to the bottom of the slot 54 without causing displacement of the member 35, and then returns to the starting position shown. During this last part of the cycle, the shaft 72 is rotated. This shaft is connected by bevel gears 73 to shafts 74, each of which has two transfer teeth 75 thereon which cooperate with transfer gears 76 on each pair of square shafts 62 in the manner described in the aforementioned patent. As there explained, the transfer gears 76 are moved into operative relationship with their transfer teeth 75 by means of a transfer tooth 77 (Fig. 15) on the numeral wheel shaft 67 which rocks transfer levers 78 whenever the numeral wheel 68 passes from 0 to 9 or from 9 to 0. Each transfer lever has an ear 80 (see also Fig. 2C) which engages a grooved collar 81 (Fig. 2B) secured to the hub of the gear 76. One flange 82 of the collar 81 is disposed in a grooved collar 83 on a pin 84 slidably mounted in the frame. A bail 85 mounted on a sleeve 86 rotatably mounted on the shaft 71 is rocked clockwise in Figure 2B to restore the pins 84 and thus gears 76.

*Operation control mechanism*

Referring to Figures 5 and 6, the plus bar 22 is secured to a vertically slidable key stem 90, and the minus bar 23 is secured to a vertically slidable key stem 91. A link 92 is pivoted to the key stem 90 at 93 and has a pin and slot connection 94 with the key stem 91. Depression of either of the keys 22, 23 causes the link 92 to engage a pin 95 on an arm 96 secured to a shaft 97. Shaft 97 is urged clockwise in Figure 5, or counter-clockwise in Figure 10A by a spring 98 attached to an arm 99 secured to the shaft 97. The shaft 97 (Fig. 7) has an arm 100 provided with a pin 101 which engages a lever 102 pivotally mounted at 103 and having an ear 104 engaging the plunger 105 of a micro switch 106. Closure of this switch starts the motor. Shaft 97 (Figs. 8 and 9) has an arm 107 which controls a pawl and ratchet clutch 108 in a well known manner. The driving side of this clutch is connected to the motor by the gear train shown in Figure 8, and comprises a pinion 109 on the motor shaft and intermediate gearing 110, 111, 112. The driven side of the clutch has attached thereto a gear 113 meshing with a gear 114 which, through a connecting rod 115 oscillates a crank 116 secured to shaft 117. Shaft 117 (Fig. 10A) is connected by an arm 118 to the piston rod 119 of a dash pot 120. The driven side of the clutch is also secured to a transversely extending shaft 121 (Figs. 5 and 6) which, at the right end, has secured thereto a cam 122 having a pin 123 thereon to which is pivoted a link 124 which is pivoted to a crank 125 on the shaft 53 so that for each revolution of the shaft 121 the shaft 53 is oscillated counter-clockwise from the position shown, and then is returned clockwise to the full cycle position. The shaft 53 has secured thereto a bail 52 (Fig. 2A) as previously described.

When either of the keys 22, 23 is depressed the gate 70 (Fig. 2B) is not positioned. This is effected subsequently by power. Key 22 has a pin 126 (Fig. 5) which engages a cam face 127 on a link 128 pivotally mounted at its front end on an arm 129, pivotally mounted at 130 on the frame. The link 128 is pivoted at its rear end on an arm 131 pivoted at 132 on the frame. Depression of key 22 causes rearward movement of the link 128 and moves the end 133 of a slot 134 in the link 128 into engagement with a pin 135 on a bellcrank 137 secured to the shaft 71 (Fig. 2B) of the gate 70. Depression of the key 22 also rocks the link 92 (Fig. 5) around the pin and slot connection 94 and a pin 138 in the link 92 engages the tail 139 of a latch 140 rotatably mounted on the shaft 97. The latch 140 which normally engages a shoulder 141 (Fig. 6) on a slide 142, releases the slide for upward movement under the influence of a spring-urged bellcrank 143 which is pivotally connected to the upper end of the slide 142. This upward movement of the slide 142 disposes the upper end thereof in front of an ear 144 on the link 128 to maintain the link 128 in its rearwardly displaced position. After the bail 52 (Fig. 2A) has reached the end of its forward stroke a cam 145 (Figs. 5 and 6) rocks its follower 146 counter-clockwise on its pivot 147. A link 148 transmits the movement of the follower to a lever 150 rotatably mounted at 151 and connected at 152 to a vertically movable slide 153 having a pin 154 therein. Pin 154 engages the cam face 155 on the slide 128 and imparts further rearward-movement to the link 128, which movement causes clockwise rotation of the shaft 71 to engage the bevel gears for additive registration, as previously described. The shaft 71 is latched in this position by a latch 156 which cooperates with an ear 157 on the bellcrank 137. When the link 128 is moved rearwardly, a cam face 160 thereon engages a pin 161 on the bellcrank 143, rocking the bellcrank 143 counter-clockwise, moving the slide 142 downwardly where it is relatched by the latch 140. As previously described, the shaft 53 is then rocked clockwise, causing digitation.

The transfer is timed by a Geneva wheel 162 (Fig. 6) pivoted about a shaft 163 which has secured thereto a gear 164 which, through intermediate gear 165 (Fig. 5) imparts a complete rotation to pinion 166 on shaft 72 (see also Fig. 2A). The Geneva wheel 162 is given a one-third revolution in the latter part of the cycle of the shaft 121 by driver pins 167 which engage the slots of the Geneva wheel 162.

At the conclusion of the cycle the gate 70 (Fig. 2B) is restored to its neutral position. A cam 122 (Fig. 6) at the end of its revolution engages a follower 170 pivoted at 171 which has a pin 172 thereon that engages the latch 156 and rotates it counter-clockwise to release the bellcrank 137. The shaft 71 is then centralized (see Fig. 10A) by a conventional centralizer mechanism 173. In case the operator does not release the key 22 in time for the latch 140 to be free to re-engage the shoulder 141 on the slide 142 when the latter is moved downwardly by the action of the cam face 160, the pin 161 and the bell crank 143, the slide 142 will be moved downwardly again near the end of the cycle by the action of the cam 122 and the cam follower 170 acting on the slide 142 through a pin and slot connection 174. By this time the key 22 normally will have been released so as to condition the latch 140 for re-engaging the slide 142 when the latch is in its lower position.

Minus registration is effected by depressing the key 23 (Fig. 5) which has a pin 175 on its key stem which engages a cam face 176 on the link 128 and moves the link 128 forwardly to bring the rear face 177 (Fig. 6) of the slot 134 into engagement with the pin 135. Depression of the key 23 also causes rocking of the link 92 about its pivot 93 and the pin 138 on the link releases the latch 140 which permits the slide 142 to move upwardly behind the ear 144 on the link 128. By the mechanism previously described, the cam 145 (Fig. 5) causes the pin 154 to be moved downwardly into engagement with the cam face 178 on the slide 128, positively rocking the bell-crank 137 counter-clockwise to move the bail shaft 71 to its subtractive position where it is held by the latch 156. The cam face 180 on the link 128 (Fig. 6) engages the pin 161 to rock the bellcrank 143 counter-clockwise as before.

The transfer gears are restored, as previously described, by rocking the bail 85 (Fig. 2B), which is secured to the sleeve 86. Referring to Figures 11 and 12, the sleeve 86 has secured thereto a cam follower 182 which cooperates with the cam 183 secured to one of the actuator shafts 74.

Keyboard lock and release

Each row of keys is provided with a conventional latch slide 185 (Fig. 2A) which is moved rearwardly by a cam 186 on the key stem, and is moved forwardly to latching position by a spring 187. A locking bail 188 is adapted to be moved upwardly to the position shown in Figure 2A to lock the latch slides 185 when the machine is in operation, and at the conclusion of the operation a bail 189 is rocked clockwise by its shaft 190 to move all of the latch slides 185 rearwardly to clear the keyboard. This is effected as follows. The shaft 53 (Figs. 2A and 14) has secured thereto a cam 192 which has a follower 193 (Fig. 14). The follower 193 is connected by a link 194 which connects the follower 193 to a pin 195 on an arm 196 rotatably mounted on a stud 197 in the frame of the machine. A link 198 connects the pin 195 to an arm 200 rotatably mounted on the shaft 190 as shown in Figure 14. One arm of the bail 189 is connected by a link 201 to a bellcrank 202 pivotally mounted on the pin 197 and pivoted to a depending portion 203 of the lock bail 188. A spring 204 urges bail 189 clockwise and through the link 201 urges the lock bail 188 upwardly, it also maintains a pin 205 on bellcrank 202 in contact with arm 196. The operation of these parts is as follows. In the forepart of the cycle the cam 192 rotates clockwise and the link 194 is moved forwardly, rocking the arm 196 counter-clockwise, bellcrank 202 follows, and the lock bail 188 is moved upwardly. In the last part of the cycle the cam 192 rotates counter-clockwise beyond the position shown, moving the arm 196 and the bellcrank 202 clockwise to withdraw the lock bail 188 and through the link 201, rock the bail 189 counter-clockwise to release the latch slides 185.

True negative total

Each numeral wheel 68 (Fig. 12) has secured thereto a gear 210 meshing with the gear 211 on a shaft 212 provided with a numeral wheel 213. The numerals on the numeral wheels 68 and 213 are arranged the same, but the wheels rotate in opposite directions at all times, and the numeral wheel 213 is adapted to display the complement of the numeral on the numeral wheel 68. For example, when the wheel 68 is standing at "9" the wheel 213 is standing at "0". Normally, the numerals on the numeral wheel 68 are visible through the windows 24 (Fig. 1). When an overdraft occurs, a true negative total is displayed through the upper row of windows 25. Windows 24 and 25 are in a shutter 215 (Figs. 11, 12 and 13). When an overdraft occurs this shutter is moved to the right in Figure 1 to display the numerals on the numeral wheels 213 and to mask the numerals on the numeral wheels 68, and a registration of "1" is effected in the units order by a mechanism which will now be described. Referring to Figure 15, the highest order numeral wheel shaft 67 is provided with a transfer tooth 77, which cooperates with a lever 217 secured to a shaft 218 which has secured thereto an arm 219 which is connected by a link 221 to an arm 222 secured to a shaft 223 having a transfer lever 224 thereon which is provided with an ear 80 that engages a grooved collar 81 (Fig. 2B) attached to a transfer gear 76 on the square shaft 62 in the units order. A transfer tooth 75 is provided on the first actuator shaft 74 and is timed to engage its pinion 76 after transfer has been effected in the highest order so that whenever the highest order numeral wheel passes through the 9–0 position the registration of "1" is effected in the units order. If the operation is negative and an overdraft occurs the highest order numeral wheel will pass from 0 to 9 and this will cause subtraction of "1" in the units order. When the overdraft is corrected by an additive operation, the highest order numeral wheel will move from 9 to 0 and this will cause "1" to be added in the units order.

The actuator shaft 74 (Fig. 11) has a cam 225 thereon which, in the course of the transfer phase raises a follower 226 which has a spring-pressed rod 227 attached thereto. Rotatably mounted on the rod 227 is a lever 228 which has a pin 229 constantly in engagement with a slot 230 (Fig. 13) in a plate 232. The follower end of the rod 227 has secured thereto an arm 235 provided with a pin 236 which normally engages in one of two holes 237. The plate 232 is rigidly attached to the shutter 215 so that the pin 236 engaging one of the holes 237 locks the shutter in its current position. When the cam 225 lifts the rod 227 it removes the lock pin 236 so that the plate 232 and the shutter 215 are free to be adjusted. The front end of the lever 228 (Fig. 12) has a pin 240 which is brought into engagement with the tooth of a gear 241 on the numeral wheel shaft 212 in the units order. This occurs during a transfer, and if an overdraft occurs the units order numeral wheel shaft 212 will be rotated one place counterclockwise. This is because the reversing gears 64, 65 are adjusted for subtraction, and when the added increment is entered in the units order it will cause the numeral wheel 68 to rotate clockwise as viewed from above, and, therefore, will rotate the gear 241 counter-clockwise. This movement is transmitted through the pin 240, the lever 228 and the pin 229 to the plate 232 which is moved to the right, moving the shutter 215 to the right, Fig. 1. At the end of the cycle, the lock pin 236 drops into the hole 237 to hold the shutter in position to display the true negative total in the windows 25. When the overdraft is corrected the numeral wheel 213 will receive an increment of movement in the opposite direction, that is, clockwise, and through the mechanism just described, the shutter will be moved to the left in Fig. 1 to again display the total standing in the numeral wheels 68.

An illustrative example of the above described mechanism is given below, in which the numbers standing in the numeral wheels 68 appear in the left-hand column, and those standing in the numeral wheels 213 are in the right-hand column. The numerals displayed by the shutter are marked with an asterisk. The figure 5369 is registered in the numeral wheels 68, 6,000 is set in the keyboard and is subtracted, this results in an overdraft and subtraction of "1" in the units order. It also causes shifting of the shutter so that the true negative total 631 is displayed. The overdraft is then corrected by adding 2579 which causes the highest order numeral wheel 68 to pass from 9 to 0 and "1" is additively registered in the units order. The shutter again shifts, and the new total, 1948, is displayed.

| Numeral wheels 68 | Numeral wheels 213 |
| --- | --- |
| *0 0 0 0 5 3 6 9<br>6 0 0 0— | 9 9 9 9 4 6 3 0 |
| 9 9 9 9 9 3 6 9<br>1— | 0 0 0 0 0 6 3 0 |
| 9 9 9 9 9 3 6 8<br>2 5 7 9+ | 0 0 0 0 0 6 3 1* |
| 0 0 0 0 1 9 4 7<br>1+ | 9 9 9 9 8 0 5 2 |
| *0 0 0 0 1 9 4 8 | 9 9 9 9 8 0 5 1 |

I claim:

1. In a calculating machine, a register, ordinally-arranged means for controlling registration of selected values therein including in each order, a selecting mechanism, a value-entering means, a differentially-reciprocable actuator, and a screw and nut, means for mounting said screw for rotation but maintaining it against endwise movement, said screw being connected to said value-entering means, said nut being reciprocated by said actuator, whereby differential rotation is imparted to said value-entering means corresponding to the differential reciprocation of said actuator.

2. In a calculating machine, a register, ordinally-arranged means for controlling registration of selected values therein including in each order, a selecting mechanism, a value-entering means including a reversing gear having a neutral non-entering position, a differentially-reciprocable actuator, a screw and nut, said screw being connected to said value-entering means, said nut being reciprocated by said actuator, whereby differential rotation is imparted to said value-entering means corresponding to the differential reciprocation of said actuator, additive or subtractive registration being determined by the adjustment of said reversing gear, and means to position said reversing gear in the non-entering position during rotation of said value-entering means in one direction.

3. In a calculating machine, a register, ordinally-arranged means for controlling registration of selected values therein including in each order, a value-entering means, a differentially-reciprocable actuator, means actuated by said actuator for imparting differential rotation to said value-entering means corresponding to the differential reciprocation of said actuator, means for controlling movement of said actuator including a normally restrained slide mounted to move parallel to the reciprocatory movement of said actuator, a spring connected between said slide and said actuator and directly urging said slide and actuator to move in opposite directions, a rack on said actuator, means for releasing the restraint on said slide, a fixed rack spaced from and extending parallel to the rack on said actuator, a gear journalled on said slide and meshing with the rack on said actuator, a pinion coaxial and fast with said gear and of less diameter than said gear meshing with said fixed rack, whereby when the restraint on said actuator is removed, the urge of said spring is effective for moving said actuator and said slide in the same direction and moving the actuator at a higher rate than the slide, and selectively settable differential stops for arresting movement of said slide, and thereby arresting movement of said actuator.

4. In a calculating machine, a value-selecting mechanism comprising, two slides interconnected by a spring tending to urge said slides in opposite directions, means to gear said slides together so that the first slide causes the second slide to move in the same direction as the first slide and so that displacement of the first slide will exceed that of the second slide, selectively settable differential stops for arresting movement of said second slide to determine the differential displacement of said first slide, a latch device comprising interengageable parts respectively on said two slides normally operative for restraining both slides against movement and in zero selection position, means responsive to the setting of any of said stops for releasing said latch, and means normally restraining said first slide and movable in each cycle of machine operation to release said slide and to restore said slide to latching position.

5. In a calculating machine, a register, ordinally arranged means for controlling registration of selected values therein including in each order, a selecting mechanism, a value entering means, an actuator reciprocable differentially according to the setting of the selecting mechanism, drive connections between said actuator and said value-entering means comprising a nut connected to said actuator so as to reciprocate therewith while being capable of rotating with respect thereto, a screw having threaded engagement with said nut and being connected to said value-entering means, and means engageable by said nut for preventing rotation of said nut during reciprocatory movement thereof, whereby differential rotation of said screw and said value-entering means will be effected by differential reciprocation of said actuator and nut.

6. In a calculating machine, a register, ordinally arranged means for controlling registration of selected values therein including in each other, a selecting mechanism, a value entering means, an actuator reciprocable differentially according to the setting of the selecting mechanism, drive connections between said actuator and said value-entering means comprising a nut connected to said actuator so as to reciprocate therewith while being capable of rotating with respect thereto, a screw having threaded engagement with said nut and being connected to said value-entering means, and a restraining member extending parallel to and adjacent to said screw to be engageable by said nut for preventing rotation of said nut during reciprocatory travel thereof, whereby differential rotation of said screw and said value-entering means will be effected by differential reciprocation of said actuator and nut.

7. In a calculating machine, a register, ordinally arranged means for controlling registration of selected values therein including in each order, a selecting mechanism, a value entering means, an actuator reciprocable differentially according to the setting of the selecting mechanism, drive connections between said actuator and said value-entering means comprising a peripherally notched nut connected to said actuator so as to reciprocate therewith while being capable of rotating with respect thereto, a screw having threaded engagement with said nut and being connected to said value-entering means, and an elongated tooth extending parallel to and adjacent to said screw and being slidably engageable by the notched periphery of said nut for preventing rotation of said nut during reciprocatory travel thereof, whereby differential rotation of said screw and said value-entering means will be effected by differential reciprocation of said actuator and nut.

8. In a calculating machine, a register, ordinally arranged means for controlling registration of selected values therein including inter-order transfer means, and in each order, a selecting mechanism, a value entering means, an actuator reciprocable differentially according to the setting of the selecting mechanism, drive connections between said actuator and said value-entering means comprising a nut connected to said actuator so as to reciprocate therewith while being capable of rotating with respect thereto, a screw having threaded engagement with said nut and being connected to said value-entering means, means for restraining said nut against rotation during only a part of the reciprocatory travel thereof, whereby when said nut is so restrained, differential reciprocation of said actuator and said nut will effect rotation of said screw and said value-entering means, and means for actuating said inter-order transfer means when said nut is not restrained by said restraining means.

9. In a calculating machine, a register, ordinally arranged means for controlling registration of selected values therein including inter-order transfer means, and in each order, a selecting mechanism, a value entering means, an actuator reciprocable differentially according to the setting of the selecting mechanism, drive connections between said actuator and said value-entering means comprising a peripherally toothed nut connected to said actuator so as to reciprocate therewith while being capable of rotating with respect thereto, a screw having threaded engagement with said nut and being connected to said value-entering means, an elongated tooth extending parallel to and adjacent to said screw and being adapted to engage in a tooth interspace in the periphery of said nut during only a part of the reciprocatory travel of said nut, whereby when said nut is engaged with said elongated tooth and is thereby restrained against rotation, differential reciprocation of said actuator and said nut will effect rotation of said screw and said value-entering means, and means for actuating said inter-order transfer means when said nut periphery is disengaged from said elongated tooth.

10. In a calculating machine, a value-selecting mechanism comprising, two slides interconnected by a spring tending to urge said slides in opposite directions, means to gear said slides together so that the first slide causes the second slide to move in the same direction as the first slide and so that displacement of the first slide will exceed that of the second slide, selectively settable differential stops for arresting movement of said second slide to determine the differential displacement of said slide, a latch device comprising interengageable parts respectively on said two slides normally operative for restraining both slides against movement and in zero setting position, means including a bail common to said settable differential stops and responsive to setting of any of said stops for releasing said latch, and means normally restraining said first slide and movable in each cycle of machine operation to release said slide and to restore said slide to latching position.

GRANT C. ELLERBECK.

REFERENCES CITED

The following references are of record in the file of this patent:

UNITED STATES PATENTS

| Number | Name | Date |
|---|---|---|
| 647,238 | Shattuck | Apr. 10, 1900 |
| 717,125 | Shattuck | Dec. 30, 1902 |
| 966,248 | Shattuck | Aug. 2, 1910 |
| 1,011,617 | Hamann | Dec. 12, 1911 |
| 1,349,049 | Crumpton | Aug. 10, 1920 |
| 1,370,493 | Blaustein | Mar. 1, 1921 |
| 1,376,518 | Duckstine | May 3, 1921 |
| 1,637,827 | Kottmann | Aug. 2, 1927 |
| 1,742,053 | Ball | Dec. 31, 1929 |
| 1,930,870 | Ball | Oct. 17, 1933 |
| 2,152,199 | Machado | Mar. 28, 1939 |
| 2,273,857 | Friden | Feb. 24, 1942 |
| 2,289,055 | Laudsiedel | July 7, 1942 |
| 2,390,041 | Avery et al. | Dec. 4, 1945 |
| 2,391,089 | Friden et al. | Dec. 18, 1945 |
| 2,411,050 | Mehan | Nov. 12, 1946 |